April 2, 1929.  F. S. STICKNEY  1,707,286
FREQUENCY METER
Filed June 7, 1926
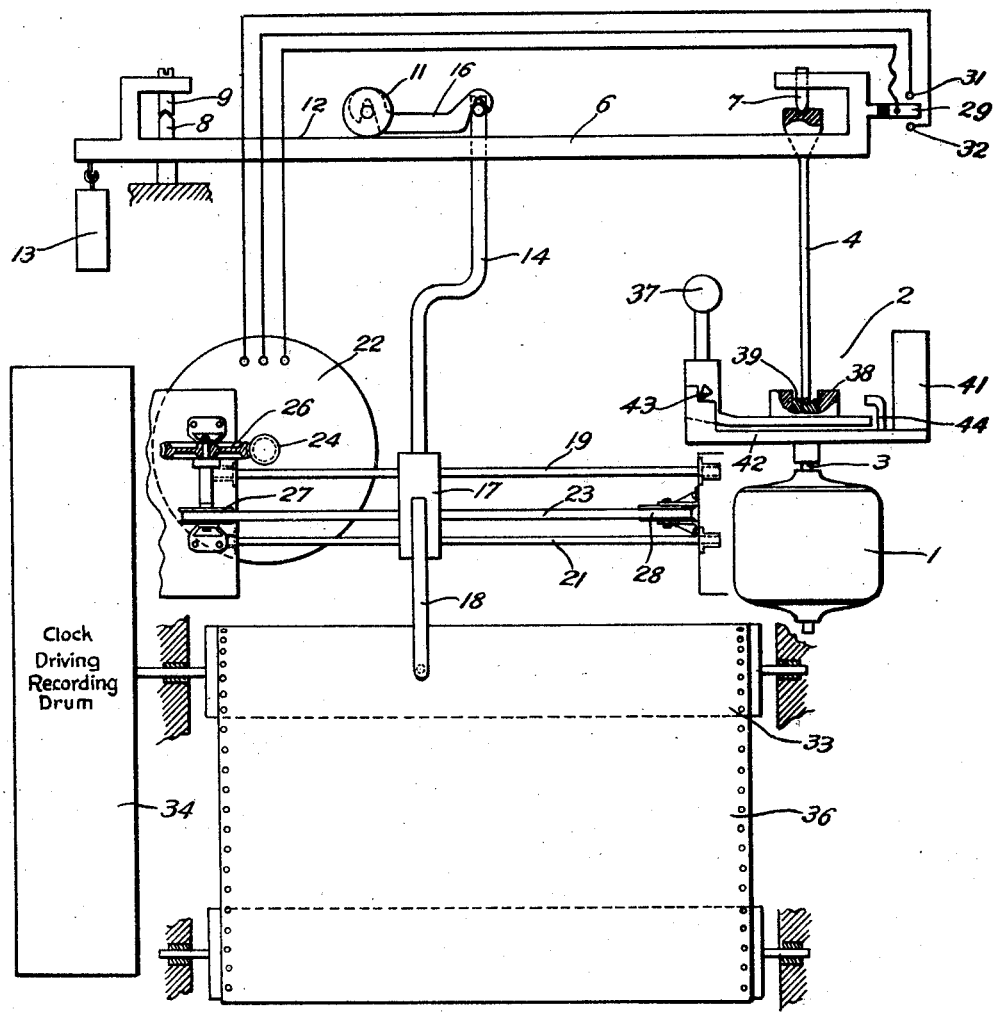
WITNESSES
Carl J. Loeck
B. R. King.
INVENTOR
Fernald S. Stickney
BY
Charles L. Soars
ATTORNEY Patented Apr. 2, 1929.

1,707,286

UNITED STATES PATENT OFFICE.

FERNALD S. STICKNEY, OF PITTSBURGH, PENNSYLVANIA, ASSIGNOR TO WESTINGHOUSE ELECTRIC & MANUFACTURING COMPANY, A CORPORATION OF PENNSYLVANIA.

FREQUENCY METER.

Application filed June 7, 1926. Serial No. 114,271.

My invention relates to frequency meters and particularly to frequency meters of the synchronous motor type.

One object of my invention is to provide a recording frequency meter, of the centrifugal type, that shall have a high degree of sensitivity and accuracy, and that shall be unaffected by wave form or voltage variations of the circuit.

Another object of my invention is to provide a frequency meter that shall be cheap to manufacture, rugged and simple in construction and accurate in operation.

A further object of my invention is to provide an instrument of the above-described type that shall be unaffected by temperature changes.

Motor operated instruments utilizing exposed worm screws for driving the pen carriage are subject to faulty operation by reason of the sticking and wearing of the worm screws. This action is especially vicious in those districts where the atmosphere contains abrasive dust.

In practicing my invention, I replace the worm drive by a flexible ribbon. This ribbon is driven by a control motor which in turn drives the pen carriage. The movement of the pen carriage is directed by two guide rods.

Springs are subject to expansion and contraction with temperature changes. This action affects the strength of the springs and introduces an error in measuring devices using them. I replace the usual springs by weights and eliminate the errors caused by temperature changes.

Other novel and useful features of my invention will be disclosed in the following description and the appended claims.

The single figure of the accompanying drawing is a diagrammatic representation of a device embodying my invention.

A synchronous motor 1 that is connected to a line, the frequency of which is to be recorded has a governor mechanism 2 mounted on its shaft 3. A pusher rod 4 connects the governor 2 to a traveler arm lever 6 through a pivot member 7. The traveler arm 6 is pivoted on a stationary pivot member 8 through a jewel bearing screw 9. A traveler 11 moves on a track 12 of the traveler arm lever 6, and a counterweight 13 is provided for counterbalancing a part of the weight of the traveler arm lever.

The traveler 11 is connected to a rigid arm 14 by means of the connecting link 16. The rigid arm 14 is in turn connected to a pen carriage 17 on which is mounted a pen 18. The pen carriage 17 is free to move horizontally on guide rods 19 and 21. A control motor 22 drives a flexible ribbon 23, which may be of metallic material, by means of a worm screw 24 and a worm gear 26 and a pulley 27. The flexible ribbon 23 is supported by the pulley 27 and an idler pulley 28.

The pen carriage 17 is so secured to the flexible ribbon 23 as to move therewith under the driving force of the control motor 22. A contact member 29 is mounted on the end of the traveler arm lever 6, in such relation to stationary contact members 31 and 32 that the engagement of the contact members 29 and 31 will cause rotation of the control motor 22 in one direction and the engagement of the contact members 29 and 32 will cause rotation of the control motor 22 in the opposite direction.

A drum 33 is mounted under the pen 18 and so driven by a clock-driving device 34 that a record sheet 36 will move at right angles to the movement of the pen 18.

The governor mechanism 2 comprises a flyball 37 connected to a weight member 38 that forms a bearing 39 of the push rod 4. A weight member 41 is mounted on the governor mechanism frame 42 in such manner as to balance the weight of the flyball 37 to prevent vibration. The flyball 37 and the weight member 38 are pivoted on the frame 42 by a knife-edge bearing 43. A stop member 44 limits the eccentricity of the flyball 37.

The relation of the weights of the flyball 37 of the governor mechanism 2 to the other weight members is such that with the pen carriage 17 in the center of the scale the governor mechanism 2 will float in its center position (normal line frequency) and neither of the fixed contact members 31 or 32 will be engaged by the movable contact member 29 on the traveler arm lever 6.

If the line frequency slightly increases, the synchronous motor 1 speeds up, the centrifugal force on the flyball 37 is increased lifting the weight member 38, and the pusher rod 4, to cause the traveler arm lever 6, to turn in a counter-clockwise direction, a small amount about the pivot member 8.

This movement causes engagement of the contact members 31 and 29. The control motor starts and moves the pen carriage 17 to the right. The traveler 11 moves with the pen carriage 17 and increases the clockwise movement of the traveler arm lever 6 about the pivot member 8. This produces an additional load on the pusher rod 4 and restores the flyball 37 to its original center position, where it remains until another change in frequency occurs. The contact members 29 and 31 are disengaged at the same time to stop the control motor.

The action in case the frequency diminishes is similar to the foregoing. The centrifugal force of the flyball 37 is reduced with a decrease in speed and the traveler arm 6 turns in a clockwise direction about the pivot member 8. The contact members 29 and 32 engage and the control motor 22 operates to move the pen carriage 17 to the left. The traveler arm 11 moves to the left also, reducing the moment about the pivot member 8 to cause the traveler arm 6 to rise, thereby reducing the weight on the pusher rod 4 and disengaging the contact members 29 and 32, thus stopping the control motor 22, and restoring the flyball 37 to its original center position.

The result of the action described is that the pen always assumes a position which is proportional to the frequency of the line and which is independent of all other influences which disturb frequency meters now available.

The pen 18 is in contact with the paper roll 36 at all times. Any movement of the pen carriage 17 will cause a corresponding movement in the pen 18. Since the clock 34 is driving the recording drum 33, a graphic record is made showing the frequency of the line at any time.

It will be understood that many modifications may be made in the device described and illustrated without departing from the spirit and scope of my invention as set forth in the appended claims.

I claim as my invention:

1. In a recording instrument comprising a movable record chart and a recording element operatively associated therewith, the combination with a normally balanced arm, centrifugal-governor means responsive to variations in a quantity to be recorded for altering the balance of said arm, and means operated in accordance with movement of said arm for actuating said recording element.

2. In a recording instrument comprising a movable record chart and a recording element operatively associated therewith, the combination with a normally balanced arm, means including a motor and a centrifugal governor associated therewith responsive to variations in a quantity to be recorded for altering the balance of said arm, flexible means operated in accordance with movement of said arm for actuating said recording element, and means operated in accordance with the movement of said recording element for effecting the balancing of said arm.

3. In a recording instrument, the combination with a device the speed of rotation of which is to be recorded, and a record chart, of a balance arm, means responsive to the speed of rotation of said device for altering the balance of said arm, a recording element and means energized upon movement of said arm for effecting the movement of said element across said chart.

In testimony whereof, I have hereunto subscribed my name this 2nd day of June, 1926.

FERNALD S. STICKNEY.